United States Patent [19]

Pürrer

[11] 4,078,734

[45] Mar. 14, 1978

[54] DRIVE ARRANGEMENT FOR FIELD CHOPPERS

[75] Inventor: Josef Pürrer, Modling, Austria

[73] Assignee: Maschinenfabrik Fahr Aktiengesellschaft Gottmadingen, Gottmadingen, Germany

[21] Appl. No.: 698,492

[22] Filed: Jun. 22, 1976

[30] Foreign Application Priority Data

Jun. 27, 1975 Germany .......................... 2528828

[51] Int. Cl.² ............................................ B02C 13/30
[52] U.S. Cl. ...................................... 241/222; 74/203
[58] Field of Search ............ 241/186 R, 186.2, 186.4, 241/222; 74/203

[56] References Cited

U.S. PATENT DOCUMENTS

| | | | |
|---|---|---|---|
| 2,196,645 | 4/1940 | Saiberlich | 241/222 |
| 2,224,309 | 12/1940 | Mack | 74/203 |
| 3,730,037 | 5/1973 | Pürrer | 74/203 |

Primary Examiner—Granville Y. Custer, Jr.
Attorney, Agent, or Firm—Karl F. Ross

[57] ABSTRACT

A drive system for a field chopper in which a belt and friction wheel transmission operates the blade drum or cutter reel and is driven from a speed-reducing and distribution drive having a number of output shafts which operate the pickup and intake elements of the harvester.

1 Claim, 6 Drawing Figures

DRIVE ARRANGEMENT FOR FIELD CHOPPERS

FIELD OF THE INVENTION

The present invention relates to field or forage harvesters of the type in which crop material is drawn through a housing and comminuted therein for blowing into a silage wagon or the like. More particularly, the invention relates to a drive arrangement for various parts of a field chopper.

BACKGROUND OF THE INVENTION

Field choppers or forage harvesters generally comprise a vehicle structure which can be drawn over the field by a tractor or may be self-propelled, and is provided with a crop pickup device for drawing a standing crop or a previously cut crop into the region of a blade drum or reel in which the crop material is comminuted and from which it is blown into a silage wagon or other transport unit associated with the harvester. From the wagon, chopped crop material may be used for direct feeding in animal husbandry or stored in a silo.

Field harvesters of this type may be used for grasses and leguminous crops by providing the crop pickup device with an apron having a mower blade at its leading edge and a batten arrangement for advancing the crop material onto this apron. Alternatively, the leading edge of the apron may be provided with pickup tines for lifting a previously mown crop material from the ground. The apron may be a conveyor belt, a large-diameter drum or a series of rollers or drums capable of advancing the crop material into the throat of the machine and toward the blade reel or drum.

Such forage harvesters and field choppers can also be used to comminute stalk crops, such as corn, and other upstanding row crops by providing the pickup with guides which run along the rows and cause the stalks to be engaged by chains or the like lifting the crop material into the throat of the machine and toward the cutter blades. Further cutters may be provided to sever the stalks at or just above ground level.

Various drive systems for such machines have been provided heretofore and, for example, they may make use of a power takeoff from the towing tractor or a self-contained prime mover and generally include a motion-distributing system for operating the various moving elements of the crop pickup and intake device. For example, between the crop pickup and the blade drum there may be provided one or more textured, toothed or even smooth rollers which facilitate advance of the crop material toward the blade drum.

It has also been proposed to provide means for reversing the sense of rotation of the pressing or crushing rollers of the crop-advance system, ahead of the blade drum or reel to enable obstructions to be cleared in a convenient manner. It is important that the blade drum or reel continue to rotate in its normal sense during such clearing operations. However, the blade drum should be rotated in the reverse or opposite sense for grinding and sharpening.

A reversal of the sense of rotation of the intake or crop-advance rollers has been described in German published application (Offenlegungsschrift) 20 11 420 (U.S. Pat. No. 3,730,037) in the form of a belt and friction wheel transmission. The belt and friction wheel transmission is provided with multistep sheaves spanned by a V-belt so that the multistep sheaves are driven in the same sense. Friction wheels are provided on the shafts and along the axes of these sheaves and, upon reduction of the interaxial spacing, peripherally engage with frictional contact to rotate the driven wheel and its sheave and shaft in the sense opposite that of the driving wheel, sheave and shaft, the belt being loosened and incapable of motion transfer in the slack condition brought about by reduction of the interaxial spacing.

A significant disadvantage of this system is that the driven shaft of this belt and friction wheel transmission is connected by chain drives with the pickup and advancing rollers. Such chain drives are particularly prone to damage because of accumulation of contaminants and wear and require continuous attention and repair. Furthermore, the chain drives obstruct access to the crop-advance rollers and the crushing or pressing rollers as well as adjustment of the blades of the machine.

OBJECTS OF THE INVENTION

It is the principal object of the present invention to provide an improved field chopper or forage harvester in which the aforementioned disadvantages are obviated.

Another object of the invention is to provide a simple and compact drive arrangement for the crop-advance and pressing rollers of such a harvester.

SUMMARY OF THE INVENTION

These objects and others which will become apparent hereinafter are attained in the present invention, in a field chopper which comprises a chassis having a blade drum, a drive element (e.g. the power-takeof shaft of a tractor or a separate prime mover) on this chassis, crop-advance and crop-pressing rollers on the chassis for feeding the crop material to the blade drum and compressing the crop material, and a belt and friction wheel transmission between the drive element and the rollers, the transmission having at its output side, a speed-reducing and distributing transmission with a plurality of output shafts and means connecting these output shafts to the individual crop-advance and crop-pressing elements of the harvester. The speed-reducing and distributing transmission can be mounted directly against the belt and friction wheel transmission so that the input shaft to the speed-reducing and distributing transmission is the output shaft of the belt and friction wheel transmission.

As a result of this construction, the drive system is a compact unit which can be made without difficulty so that, from the housing of the second transmission all of the individual shafts necessary for driving the individual elements of the crop-feed device can extend. If the coupling between the several output shafts of the second transmission and the driven elements of the crop-feed unit are Cardan or universal-joint shafts, chain drives are completely eliminated, repair and maintenance costs are reduced and the need for constant supervision is excluded. Accessibility to any parts which may require clearing is improved and a direct switch-over from forward drive to reverse drive without intervening stages can be obtained.

Preferably the distribution transmission is contained within a sealed oil-filled housing so that here again a reduction in the maintenance cost is obtained. Advantageously, the belt sheaves, friction wheels and distributing transmission can form a unit which is spaced laterally from the crop-advance and crop-pressing rollers to improve the accessibility to the latter. The drive can be provided on one side of the machine while the rollers and chopping drum are on the opposite side, the space between being bridged by the aforementioned universal-joint shafts. The lateral separation of the drive system and the rollers which are to be driven permits the output shafts of the distributing transmission to be coaxial and aligned with the corresponding drive shafts of the crop-advance and pressing rollers.

According to a feature of the invention, the drive unit is mounted upon the chassis or frame of the machine for swinging movement about a horizontal axis perpendicular to the plane of the belt transmission to enable tensioning or slackening of the belt and disengagement or engagement of the friction surfaces of the friction wheels respectively. The Cardan or universal-joint shafts remain coupled even though the housing is swung.

The pivot axis of the transmissions is so offset from the center of gravity thereof that the weight of the transmissions themselves maintains the desired degree of tension on the belt. In other words, the center of gravity of the transmission lies to the side of the pivot axis opposite that at which the driving belt sheave is disposed. With such an arrangement the belt tension is increased by the reaction moment of the driving operation.

To swing the transmissions about the aforementioned pivot axis in a sense opposite the tensioning direction and to switch over from forward drive to reverse drive, a mechanical linkage can be provided to a manual actuator or a hydraulic cylinder as a servor follower can be used. A feeding-responsive means of the latter type can also serve to increase the force applied between the frictional surfaces during reverse drive.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 2:
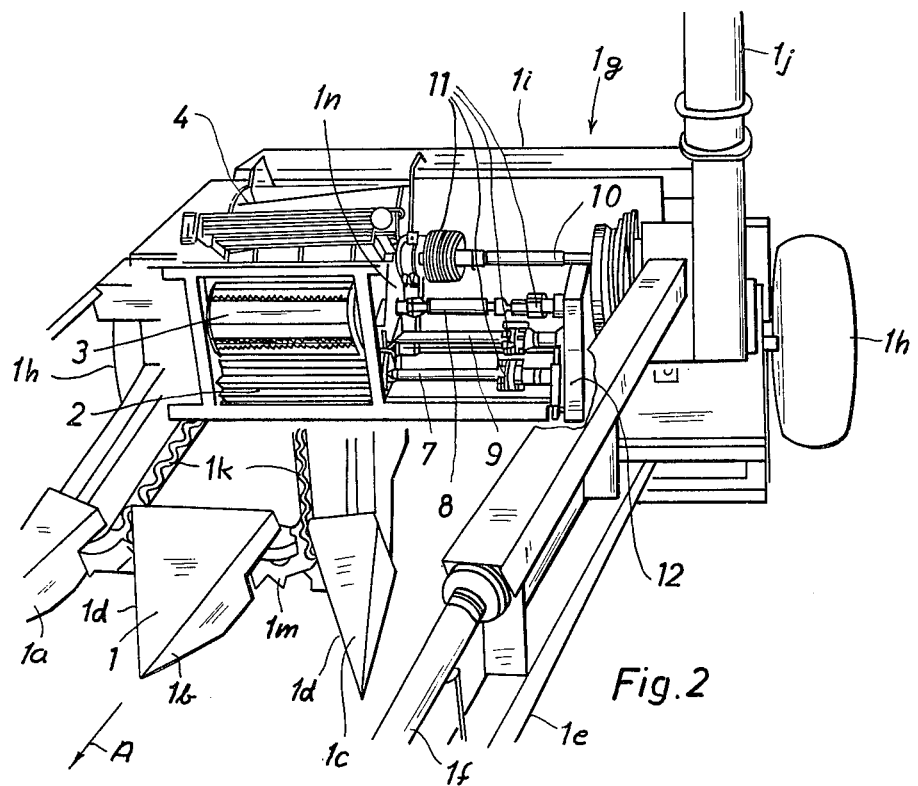
FIG. 2 is a diagrammatic perspective view, illustrating the parts with more structure than in FIG. 1a, with housing portions removed and broken away, of the field chopper.

The field chopper according to the invention is provided with a pickup attachment 1 which can be any of the conventional intake devices well known in the field-chopper art. As shown in FIG. 2, for example, it can be a corn stalk harvester having three shoes 1a, 1b, and 1c defining channels 1d between them, the corn passing along these channels as the field chopper is displaced along a row. To this end the harvester may be provided with a towbar 1e connected to the drawbar of a tractor (not shown) whose power takeup shaft is connected by a universal joint to the power takeoff transmission shaft 1f forming the input to the transmission means described below.

The chassis or frame 1g of the machine also carries wheels 1h adapted to roll along the ground and a housing structure, represented only in part at 1i provided with a blower pipe 1j for discharging the crop material.

In the case of a corn head at the front of the machine, chains 1k are provided to lead the stalks inwardly between the crusher or pressing rolls 2 and 3 and to the blade drum or reel 4 for chopping. A cutter 1m is provided at the throat of each channel 1d to sever the stalks from the ground.

Figure 1A:
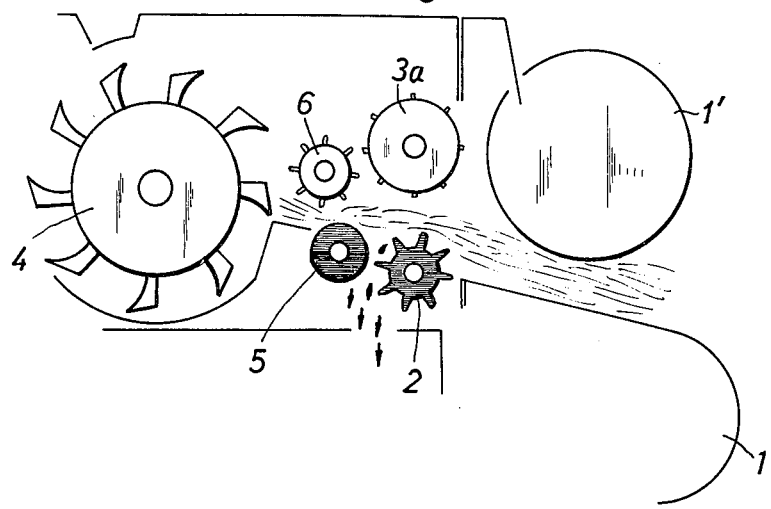
FIG. 1a is a diagrammatical vertical section through the crop-intake and advance arrangement for a field chopper according to the invention as seen in side view.
Figure 1B:
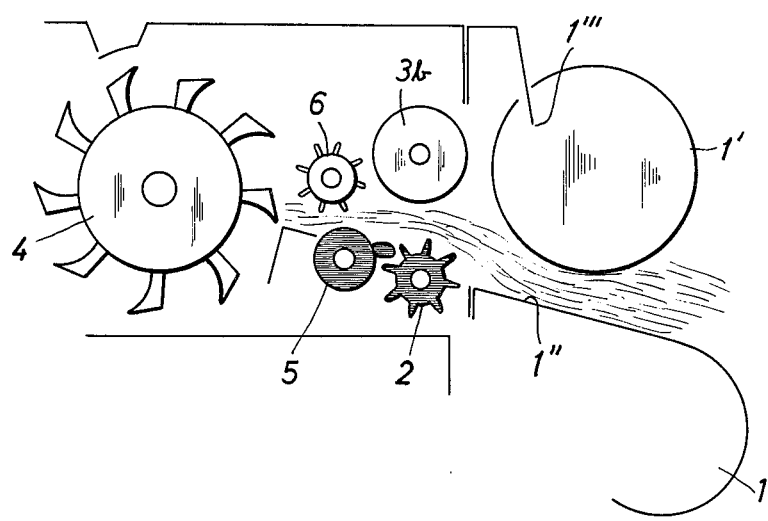
FIG. 1b is a similar view of a modified pickup and crop-feed arrangement.

FIGS. 1a and 1b show diagrammatically a pickup 1 for a swath or windrow of previously mown crop, member 1' representing a batten reel to compact the crop material slightly and hold it against the apron 1" as the crop material feeds into the inlet 1''' of the machine housing.

The intake rollers include a lower profile feed roller 2 and an upper pressing or crushing roller 3a or 3b the former being provided with teeth while the latter is smooth. The crop material is drawn between the rollers 2 and 3a or 3b and, therefore, to the left between a smooth lower roller 5 and a profiled or ridged upper roller 6. The crop material then passes into the path of the blades of the blade drum or reel 4.

The blade drum or reel 4 rotates in the clockwise sense for normal chopping operations (FIGS. 1a or 1b) and is only rotated in the opposite sense for sharpening, using a conventional sharpening-stone arrangement (not shown). However, the crop-intake and advancing members 2, 3a, 3b, 5, 6 are reversible to clear jams in the machine. During this reverse movement, the blade drum 4 can continue rotating in its normal sense (clockwise).

The lower ribbed roller 2 acts as a stone separator, the small stones being entrained in pockets between the ribs of this roller and falling downwardly ahead of the smooth roller 5. Larger stones are caught between the rollers 2 and 5 and reversal of the rollers, while the blade drum continues its operative rotation, eliminates the jam.

The drive shaft of the field chopper extends through a lateral wall of the chopper housing and is connected to the power takeoff shaft 1f while the drive shafts of the crop-feed elements 2, 3a, 3b, 6 project toward the side of the chopper through a wall 1n of the housing, the blade drum and the rollers being located on the opposite side of the frame. On the right-hand side of the frame (FIG. 2), therefore, the drive arrangement is disposed with a lateral distance from the crop-feed devices 2, 3a, 3b and 6.

For each of the shafts of these devices there is a respective Cardan or universal-joint shaft. For example, the intake roller 2 is provided with a universal-joint shaft 7, the pressing roller 3a or 3b is provided with a universal-joint shaft 8, for the smooth roller 5 there is provided a universal-joint shaft 9 and for the blade drum 4 there is a universal-joint shaft 10.

Each of these drives, in series with the respective universal-joint shaft, is provided with a separate overrunning clutch 11 to prevent overloadings.

A speed-reducing distributing transmission 12 has respective output shafts each of which is aligned with the roller shafts 2, 3a or 3b and 5 and is connected thereto by the aforementioned universal-joint shafts 7 – 9. The drive shaft of the distributing transmission carries a friction wheel 13 of a belt and friction wheel drive. The friction wheel 13 is associated with a friction wheel 14. A V-belt 15 connects two multistage sheaves 16 and 17 of which the sheave 16 is coaxial with and connected to friction wheel 13 on the drive shaft of the transmission 12 while the multistage sheave 17 is seated on the shaft of the friction wheel 14.

Figure 3:
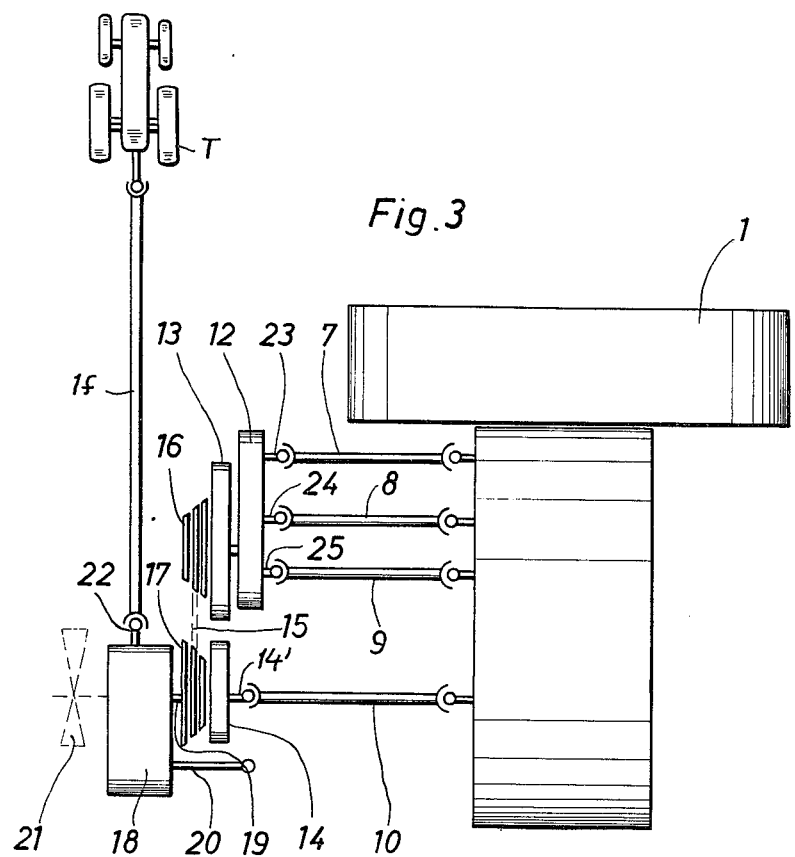
FIG. 3 is a schematic plan view of the field chopper showing the drive system.

A main drive 18 has two mutually parallel output shafts (driven shafts) 19 and 20 which carry the sheaves 17 and friction wheel 14 and drive the blade drum 4 via the universal-joint shaft 10 (FIG. 3). For reversal of the blade drum, the universal-joint shaft 10 can be disconnected from the shaft 14' of the friction wheel 14 and connected to the shaft 20 via a quick-coupling arrangement. The transmission 18 thus drives the blower rotor 21 of the field chopper directly. This rotor or blade is shown at 21 diagrammatically. The power takeoff input shaft for the transmission 18 is represented at 22 and is connected as originally noted by the shaft 1f to the tractor T.

The distributing transmission 12 with the friction wheel 13 and the multistage sheave form a transmission unit which has the output shafts 23, 24 and 25 respectively connected to the universal-joint shafts 7 – 9 of the roller 2, the rollers 3a or 3b, and the roller 5. The latter roller can be connected by any desired transmission means e.g. a chain connected to a sprocket of shaft 9, to the pickup device, stalk-engaging chains, cutters and the like of the head of the machine.

The distributing transmission 12 has a closed housing (FIG. 3) which may be filled with oil for maintenance-free operation.

Figure 4A:
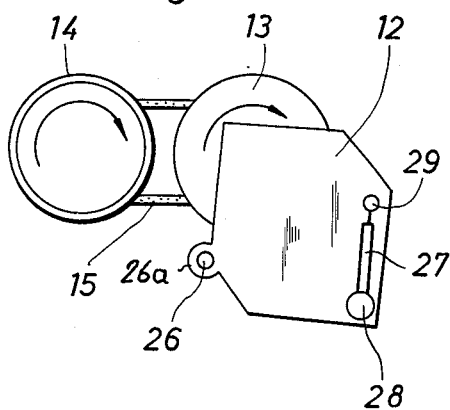
FIGS. 4a and 4b are schematic side-elevational views, showing the drive system in two alternative positions.
Figure 4B:
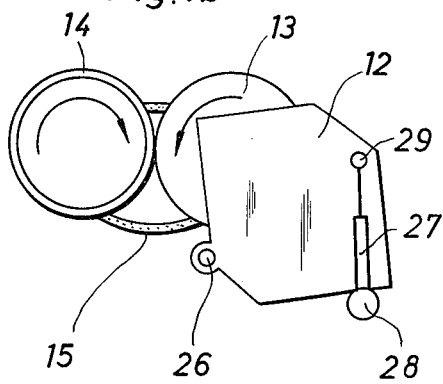

The drive system or unit consisting of the distributing transmission 12, friction wheel 13 and sheave 16 constitutes a rigid unit which is provided with an eye 26a (FIGS. 4a and 4b) receiving a pivot axis 26 about which the transmission 12 is swingable. This axis is perpendicular to the plane of the belt 15 which connects the sheaves 16 and 17 and to the direction of advance of the chopper see (arrow A) in FIG. 2. The center of gravity of the housing 12 and the remainder of the drive assembly swingable therewith lies somewhat to the right of the pivot axis 26 so that the weight of the assembly normally tensions the belt 15 by a tendency to swing in the clockwise sense (FIG. 4a).

The transmission comprises a positioning member 27 which engages the housing 12 and has been illustrated as a hydraulic cylinder which is pivotally connected at 28 to the machine frame and has a piston rod whose free end is pivotally connected at 29 to the oil-bath housing of the distributing transmission 12. As a result the entire assembly forms a lever fulcrumed at 26. When the piston is extended (FIG. 4b) the transmissions are swung in the counterclockwise sense to slacken the belt 15 and bring the wheels 13 and 14 into frictional contact. The input wheel 13 to housing 12 is thereby rotated in the opposite sense.

I claim:

1. A drive for a field chopper having a chassis, a blade drum rotatable on said chassis and a crop-feed device ahead of said blade drum including a plurality of rotatable crop-engaging members, said drive comprising:
   a first transmission including:
      an input shaft,
      a first sheave mounted on said input shaft for rotation therewith,
      a first friction wheel mounted on said input shaft for rotation therewith,
      an output shaft spaced from but parallel to said input shaft,
      a second sheave mounted on said output shaft for rotation thereof,
      a second friction wheel mounted on said output shaft while lying in a common plane with said first friction wheel whereby interengagement of said wheel frictionally drives said second wheel upon rotation of said input shaft, and
      a belt spanning said sheaves; means mounted on said chassis for driving said input shaft; a speed-reducing distributing transmission including:
      a housing laterally spaced from said members and pivotally mounted on said chassis, said housing carrying said output shaft and being tiltable on said housing about an axis parallel to but laterally offset from said output shaft, the tilting of said housing about said axis displacing said second friction wheel toward said first friction wheel to slacken said belt spanning said sheaves and bringing said wheels into direct frictional engagement, and
      a plurality of further shafts each connectable to a respective one of said members and being substantially aligned therewith in at least one position of said housing for driving said members in speed-reduced relation to the speed of said output shaft, said speed-reducing distributing transmission, said output shaft, said second sheave and said second wheel forming a unit which is swingable about said axis and has a center of gravity disposed with respect to said axis such that the weight of the unit tensions said belt;
   control means on said chassis acting upon said housing for swinging said unit about said axis;
   a respective universal-joint shaft connecting each of said further shafts with a respective one of said members; and
   another universal-joint shaft connecting said input shaft with said drum for driving same.

* * * * *